(12) United States Patent
Carralero et al.

(10) Patent No.: US 9,158,294 B2
(45) Date of Patent: Oct. 13, 2015

(54) MICROGRID CONTROL SYSTEM

(71) Applicant: The Boeing Company, Chicago, IL (US)

(72) Inventors: Michael A. Carralero, Huntington Beach, CA (US); Jimmy M. Quiambao, Walnut, CA (US); Dale Kenneth Pounds, Festus, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/069,549

(22) Filed: Nov. 1, 2013

(65) Prior Publication Data

US 2015/0134131 A1 May 14, 2015

Related U.S. Application Data

(63) Continuation of application No. 12/909,283, filed on Oct. 21, 2010, now Pat. No. 8,682,495.

(51) Int. Cl.
| | |
|---|---|
| *G06F 1/26* | (2006.01) |
| *G06F 15/173* | (2006.01) |
| *G05B 15/02* | (2006.01) |
| *H04L 12/24* | (2006.01) |
| *H04L 29/08* | (2006.01) |

(52) U.S. Cl.
CPC *G05B 15/02* (2013.01); *G06F 1/26* (2013.01); *H04L 41/12* (2013.01); *H04L 67/12* (2013.01); *Y04S 40/164* (2013.01)

(58) Field of Classification Search
CPC ......... G06F 1/26; Y04S 40/164; H04L 41/12; H04L 67/12; G05B 15/02
USPC .............................. 700/22, 286, 295; 709/225
See application file for complete search history.

(56) References Cited

U.S. PATENT DOCUMENTS

| | | |
|---|---|---|
| 5,469,365 A | 11/1995 | Diekema et al. |
| 5,530,435 A | 6/1996 | Toms et al. |
| 5,907,285 A | 5/1999 | Toms et al. |
| 6,133,845 A | 10/2000 | Toms et al. |
| 6,167,525 A | 12/2000 | Donazzi et al. |
| 6,211,796 B1 | 4/2001 | Toms et al. |
| 6,347,027 B1 | 2/2002 | Nelson et al. |

(Continued)

FOREIGN PATENT DOCUMENTS

| | | |
|---|---|---|
| EP | 1976218 A1 | 10/2008 |
| WO | WO2010003724 A2 | 1/2010 |

OTHER PUBLICATIONS

International Search Report and Written Opinion, dated Dec. 12, 2012, regarding Application No. PCT/US2011/052205, 13 pages.

(Continued)

*Primary Examiner* — Charles Kasenge
(74) *Attorney, Agent, or Firm* — Yee & Associates, P.C.

(57) ABSTRACT

A method, apparatus, and computer program product is provided for configuring a microgrid. A first configuration of the microgrid having a set of microgrid elements is initialized. An address for each element in the set of microgrid elements of the microgrid is verified. In response to receiving status data from the set of microgrid elements connected in a peer-to-peer network indicating a reconfiguration of the microgrid, the set of microgrid elements is re-aligned to form a second grid configuration. The second grid configuration is executed.

20 Claims, 6 Drawing Sheets

(56) References Cited

U.S. PATENT DOCUMENTS

| | | |
|---|---|---|
| 6,424,248 B1 | 7/2002 | Toms et al. |
| 6,542,928 B1 | 4/2003 | Hammons |
| 6,928,476 B2 | 8/2005 | Bucher |
| 6,982,953 B1 | 1/2006 | Swales |
| 7,031,998 B2 | 4/2006 | Archbold |
| 7,136,709 B2 | 11/2006 | Arling et al. |
| 7,149,605 B2 * | 12/2006 | Chassin et al. ............ 700/295 |
| 7,218,998 B1 * | 5/2007 | Neale ............ 700/295 |
| 7,571,227 B1 * | 8/2009 | Pabla ............ 709/224 |
| 7,831,702 B2 | 11/2010 | Johnson |
| 7,904,569 B1 | 3/2011 | Gelvin et al. |
| 7,961,740 B2 | 6/2011 | Flammer, III et al. |
| 8,010,240 B2 * | 8/2011 | Mattiocco et al. ............ 700/296 |
| 8,013,573 B2 * | 9/2011 | Seo et al. ............ 320/116 |
| 8,072,727 B2 | 12/2011 | O'Leary et al. |
| 8,073,573 B2 | 12/2011 | Chassin et al. |
| 8,140,194 B2 | 3/2012 | Iino et al. |
| 8,279,870 B2 | 10/2012 | Flammer, III et al. |
| 8,626,319 B2 * | 1/2014 | Weatherhead ............ 700/22 |
| 8,803,362 B2 * | 8/2014 | Schmiegel ............ 307/85 |
| 8,831,789 B2 * | 9/2014 | Weatherhead et al. ....... 700/295 |
| 2002/0057018 A1 | 5/2002 | Branscomb et al. |
| 2005/0159823 A1 | 7/2005 | Hayes et al. |
| 2005/0206505 A1 | 9/2005 | Arcaria |
| 2005/0251296 A1 | 11/2005 | Nelson et al. |
| 2006/0064205 A1 | 3/2006 | Ying |
| 2006/0184665 A1 | 8/2006 | Reister et al. |
| 2007/0288195 A1 | 12/2007 | Waite et al. |
| 2009/0015426 A1 | 1/2009 | Long et al. |
| 2010/0082792 A1 | 4/2010 | Johnson |
| 2010/0117452 A1 * | 5/2010 | Dunnmon et al. ............ 307/72 |
| 2010/0152914 A1 * | 6/2010 | Ying ............ 700/295 |
| 2010/0191996 A1 * | 7/2010 | Iino et al. ............ 713/323 |
| 2010/0274407 A1 | 10/2010 | Creed |
| 2011/0004589 A1 | 1/2011 | Rischar et al. |
| 2011/0015801 A1 * | 1/2011 | Mazzarella ............ 700/297 |
| 2011/0080044 A1 * | 4/2011 | Schmiegel ............ 307/23 |
| 2011/0204717 A1 * | 8/2011 | Shaffer ............ 307/18 |
| 2012/0101639 A1 | 4/2012 | Carralero et al. |
| 2012/0200426 A1 | 8/2012 | DiLuciano et al. |

OTHER PUBLICATIONS

Funabashi et al., "Field Tests of a Microgrid Control System," Proceedings of the 41st International Universities Power Engineering Conference (UPEC '06), Sep. 2006, pp. 232-236.

McArthur et al., "Multi-Agent Systems for Power Engineering Applciations—Part I: Concepts, Approaches and Technical Challenges," IEEE Transactions on Power Systems, vol. 22, No. 4, Nov. 2007, pp. 1743-1752.

McArthur et al., "Multi-Agent Systems for Power Engineering Applciations—Part II: Technologies, Standards, and Tools for Building Multi-agent Systems," IEEE Transactions on Power Systems, vol. 22, No. 4, Nov. 2007, pp. 1753-1759.

Oyarzabal et al., "Agent based Micro Grid Management System," Proceedings of the 2005 International Conference on Future Power Systems, Nov. 2005, 6 pages.

Pedrasa et al., "A Survey of Techniques Used to Control Microgrid Generation and Storage during Island Operation," Conference Proceedings of the 2006 Australasian Universities Power Engineering Conference (AUPEC'06), Dec. 2006, 6 pages.

Pipattanasomporn, "Multi-Agent Systems in a Distributed Smart Grid: Design and Implementation," Proceedings of the IEEE PES 2009 Power Systems Conference and Exposition (PSCE'09), Mar. 2009, pp. 1-8.

"Microgrid Energy Management System," California Energy Commission, Consultant Report P500-03-091F, Oct. 2003, 83 pages.

"Powering America's Defense: Energy and the Risks to National Security," CNA Analysis & Solutions, May 2009, 74 pages.

Office Action, dated Feb. 6, 2013, regarding U.S. Appl. No. 12/909,283, 16 pages.

Final Office Action, dated Jul. 26, 2013, regarding U.S. Appl. No. 12/909,283, 10 pages.

Notice of Allowance, dated Nov. 5, 2013, regarding U.S. Appl. No. 12/909,283, 10 pages.

Carrelero et al., "Microgrid Control System," U.S. Appl. No. 14/064,997 and Preliminary Amendment, filing date Oct. 28, 2013, 61 pages.

Office Action dated Sep. 29, 2014, regarding U.S. Appl. No. 14/064,997, 18 pages.

Final Office Action dated Feb. 5, 2015, regarding U.S. Appl. No. 14/064,997, 11 pages.

Notice of Allowance dated Mar. 13, 2015, regarding U.S. Appl. No. 14/064,997, 7 pages.

IP Australia Patent Examination Report No. 1, dated Jun. 22, 2015, regarding Application No. 2011318478, 2 pages.

\* cited by examiner

MICROGRID CONTROL SYSTEM

This application is a continuation of U.S. application Ser. No. 12/909,283, filed Oct. 21, 2010.

BACKGROUND INFORMATION

1. Field

The present disclosure relates generally to power grids and, in particular, to a method, apparatus, and computer program product for managing microgrids. Still more particularly, the present disclosure relates to a method, apparatus, and computer program product for an adaptable microgrid robust control system.

2. Background

Currently, most electric power is generated by macrogrids. Macrogrids typically are large, centralized power plants, such as nuclear power plants, hydroelectric plants, and fossil fuel powered plants. Macrogrids commonly have good economies of scale. However, macrogrids frequently require power to be transmitted across long distances. These large facilities frequently generate power using non-renewable sources of energy, such as coal or gas. These facilities may negatively impact the environment.

A microgrid is a localized grouping of electric power generation sources and loads. A microgrid may also be referred to as, without limitation, a smart-grid, mini-grid, or virtual power plant. However, existing microgrid control systems tend to be overly complex and under-utilize renewable resources.

Therefore, it would be advantageous to have a method and apparatus that takes into account one or more of the issues discussed above, as well as other issues.

SUMMARY

In one advantageous embodiment, a method is provided for configuring a microgrid. A first configuration of the microgrid having a set of microgrid elements is initialized. An address for each element in the set of microgrid elements of the microgrid is verified. In response to receiving status data from the set of microgrid elements connected in a peer-to-peer network indicating a reconfiguration of the microgrid, the set of microgrid elements is re-aligned to form a second grid configuration. The second grid configuration is executed.

In another advantageous embodiment, a method for monitoring a microgrid is provided. Status data is received from a set of microgrid controller elements connected in a peer-to-peer network connecting the set of microgrid controller elements within the microgrid local area network. In response to the status data indicating a change in the microgrid that exceeds a threshold level, the set of microgrid controller elements and a set of tasks associated with the set of microgrid controller elements is re-aligned to form a re-aligned microgrid configuration. The re-aligned microgrid configuration is executed.

In yet another advantageous embodiment, an apparatus comprises a microgrid and a microgrid controller associated with the microgrid configured to initialize a first configuration of a microgrid having a set of microgrid elements. The microgrid controller is configured to verify an address for each element in the set of elements of the microgrid. The microgrid controller is configured to re-align the set of elements to form a second grid configuration in response to receiving status data from the set of microgrid elements connected in a peer-to-peer network indicating a reconfiguration of the microgrid. The microgrid controller is configured to execute the second grid configuration.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
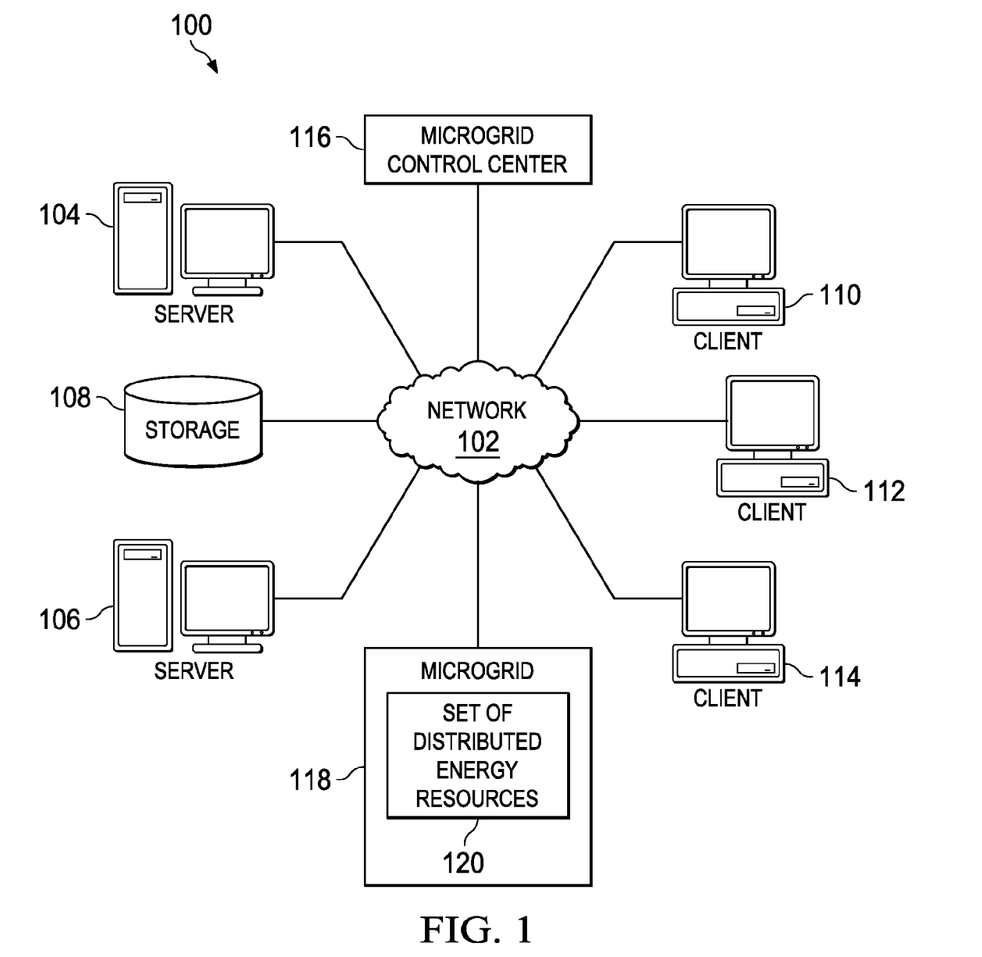
FIG. 1 is an illustration of a data processing environment for a microgrid control system in accordance with an advantageous embodiment.

With reference now to the figures and in particular with reference to FIG. 1, an illustrative diagram of a data processing environment for a microgrid control system is provided in which illustrative embodiments may be implemented. It should be appreciated that FIGS. 1-5 are only provided as illustrations of data processing environments for the depicted implementations in FIGS. 1-5 and are not intended to imply any limitations with regard to the environments in which different embodiments may be implemented. Many modifications to the depicted environments may be made.

FIG. 1 depicts a pictorial representation of a network of data processing systems in which advantageous embodiments may be implemented. Network data processing system 100 is a network of computers in which the advantageous embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes, or host computers, consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN).

Microgrid control center 116 is a workstation that manages, control, and monitors the elements in microgrid 118. In this example, microgrid control center 116 is located remotely from microgrid 118. However, in another embodiment, microgrid control center 116 may be located locally to microgrid 118.

Microgrid 118 is an electric energy generation network having set of distributed energy resources 120. Set of distributed energy resources 120 is a set of one or more distributed energy resources.

A distributed energy resource may be a small scale power generation element, such as, without limitation, a wind turbine, photovoltaic system, a fuel cell, a geothermal power generator, microturbine, combustion turbine, reciprocating engine, hybrid system, combined heat and power, or a hydroelectric power generator.

FIG. 1 is intended as an example, and not as an architectural limitation for the different illustrative embodiments.

The different advantageous embodiments recognize and take into account a number of different considerations. For example, the different advantageous embodiments recognize and take into account that current microgrid power systems are centralized and face increasing challenges from the number of control variables and the complexity of the microgrid system due to changes to dynamic environments. The advantageous embodiments recognize that current, centralized microgrid control systems require software that is increasingly complex and extended in size due to the complex and dynamic environments of these systems.

The different advantageous embodiments recognize and take into account that distributed energy resources in a microgrid reduces the amount of energy lost in transmission by generating power at or near where the power is used. This reduces the size and number of power lines. The different advantageous embodiments recognize and take into account that distributed energy resources are smaller scale power generation resources that frequently utilizes renewable energy sources.

The different advantageous embodiments also recognize and take into account that current microgrid control systems have accessibility which requires only a tier wall of security to overcome. This creates security risks and vulnerability to hackers and other security breaches.

The different advantageous embodiments recognize and take into account that it would be advantageous to provide a robust microgrid control system that increases the use of renewable energy sources, distributed generation, energy storage, and power quality with uninterruptible power supply and network health management capabilities.

The different advantageous embodiments also recognize and take into account that it would be advantageous to provide a microgrid control system with cyber security at multiple levels to provide additional security.

Thus, the different advantageous embodiments provide a method, apparatus, and computer program product for configuring a microgrid. In one embodiment, a first configuration of a microgrid having a set of microgrid elements is initialized. The set of microgrid elements is a set having two or more microgrid elements. The set of microgrid elements may include, without limitation, distributed energy resource sensor(s), distributed energy resource controller element(s), processor(s), and network element(s). A network element may include, without limitation, router(s), server(s), and distributed energy resource(s).

An Internet protocol address for each element in the set of microgrid elements of the microgrid is verified. An average load and a common load associated with the set of microgrid elements is identified.

Status data from the set of microgrid elements connected in a peer-to-peer network within a microgrid local area network is received. The status data is data indicating the health of a microgrid element, a load associated with a distributed energy resource, a state of a microgrid element. The status data indicating a load associated with a distributed energy resource may describe a power demand at a given time, electric power output at a given time, an amount of electric power in battery storage, and/or power generation efficiency over a given period of time.

In response to the status data indicating a reconfiguration of the microgrid, the set of microgrid elements is re-aligned to form a second grid configuration. As used herein, the term re-align refers to changing one or more task(s) associated with a microgrid element, changing a load associated with a distributed energy resource, and/or changing relationships between elements and distributed energy resources within a microgrid to create a new configuration.

Re-aligning the set of elements may include changing a set of tasks to be performed by a given element, re-designating a function of a given element, or activating a redundant element to replace a failed element. For example, re-aligning a set of microgrid elements may include changing a master processor to a slave processor, changing a slave processor to a master processor, increasing a load on a given distributed energy resource, decreasing a load on a given distributed energy resource, adding a distributed energy resource to the microgrid, removing a distributed energy resource from the microgrid, adding a controller element to the microgrid, removing or replacing a controller element, re-assigning a function of a first controller element to a second controller element, or any other change in the tasks and relationships between microgrid elements.

The second grid configuration is executed to enable the microgrid to continue producing power using the re-aligned set of elements in the second grid configuration. For example, if re-aligning the set of elements included assigning a first processor to act as a master processor and a second processor to act as a slave processor, when the second grid configuration is executed, the first processor begins performing the tasks associated with the master processor and the second processor begins performing the tasks assigned to the slave processor.

Figure 2:
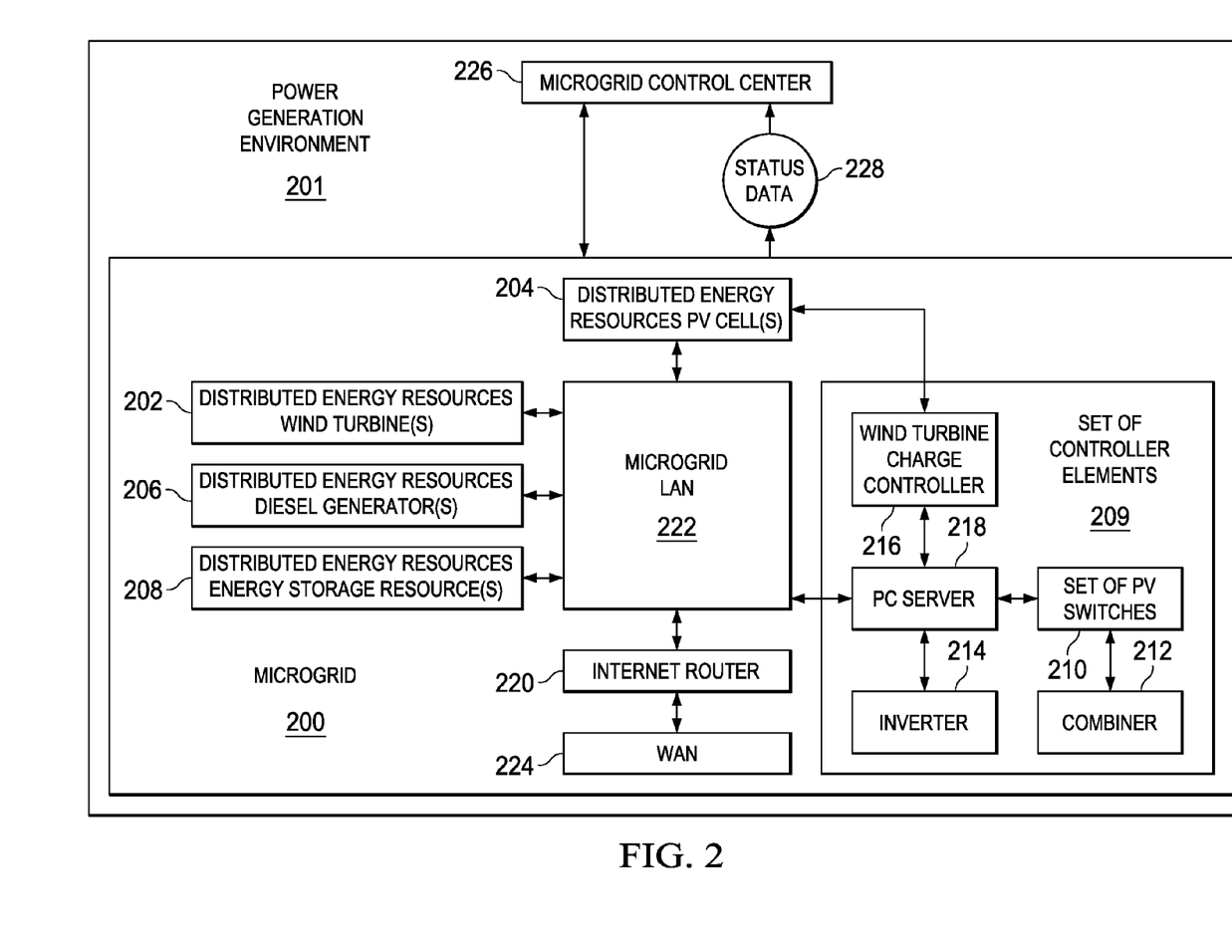
FIG. 2 is an illustration of a microgrid in accordance with an advantageous embodiment.

With reference now to FIG. 2, an illustration of a microgrid is shown in accordance with an advantageous embodiment. Microgrid 200 is a localized grouping of electricity generating resources and loads within power generation environment 201. Microgrid 200 may be a microgrid, such as, without limitation, microgrid 118 in FIG. 1.

Microgrid 200 comprises one or more distributed energy resources, such as, without limitation, distributed energy resources (DERs) 202, 204, 206 and 208. In this advantageous embodiment, microgrid 200 is connected to four distributed energy resources, however, microgrid 200 may be connected to only a single distributed energy resource, two distributed energy resources, three distributed energy resources, as well as, five or more distributed energy resources.

Distributed energy resources 202, 204, 206, and 208 may be implemented as any type of distributed energy resources. In the embodiment shown in FIG. 2, microgrid 200 comprises wind turbine(s), photovoltaic cell(s), energy storage resource(s), and diesel generator(s). However, microgrid 200 may also be implemented using any other type of known or available distributed energy resources. In another advantageous embodiment, microgrid 200 may optionally also be connected to a central utility.

Each distributed energy resource on microgrid 200 can be installed or disconnected without interrupt to microgrid 200 performances and/or power output. Each distributed energy resource on microgrid 200 is autonomous. Each distributed energy resource integrated into microgrid 200 has the ability to collaborate and/or communicate with other microgrid elements to perform specific tasks.

Microgrid 200 comprises set of controller elements 209. As used herein, the term "set" refers to one or more items, unless defined otherwise herein. As shown in FIG. 2, set of controller elements 209 is a set of one or more controller elements. Thus, set of controller elements 209 may include a single controller element, as well as, two or more controller elements.

A controller element in set of controller elements 209 may be a distributed energy resource controller, a sensor, or a network element. For example, a controller element may be, without limitation, a charge controller, a switch, an inverter, a router, a server, a processor, a voltage monitor, an ampere monitor, a load bank, a distributed energy resource control panel, a battery bank control, automatic transfer switch, router, processor, Ethernet switch, or universal protocol converter.

In this example, set of controller elements 209 includes without limitation, set of photovoltaic (PV) switches 210, combiner 212, inverter 214, wind turbine (WT) charge controller 216, and PC server 218. Set of controller elements 209 may also include Internet router 220.

The microgrid controller elements shown in FIG. 2 are only examples of some possible controller elements that may be included in microgrid 200. Microgrid 200 may not include all of the controller elements shown in FIG. 2. Likewise, microgrid 200 may include other additional controller elements not shown in FIG. 2.

Microgrid local area network 222 is a local area network connecting the set of controller elements in microgrid 200. In the example shown in FIG. 2, microgrid local area network 222 connects distributed energy resources 202, 204, 206, and 208 with the controller elements having an internet protocol (IP) address in a peer-to-peer network within microgrid local area network 222. In this manner, microgrid local area network 222 permits each controller element in microgrid 200 to transmit status information for that controller element to other controller elements on microgrid 200.

A user at a remote client may connect to microgrid local area network 222 and obtain status and/or load information associated with distributed energy resources and controller elements on microgrid 200 by connecting to microgrid local area network 222 through internet router 220.

Internet router 220 provides a single, common redundant network port. In other words, Internet router 220 acts as a gate controlling remote Internet access to microgrid local area network 222 and any components connected to microgrid local area network 222.

A set of cyber-security methods and tools may be applied to Internet router 220. In other words, a set of cyber-security methods and tools may be implemented on the single, redundant network port at Internet router 220.

The set of cyber-security methods and tools may be a set having a single cyber-security method and/or tool, as well as a set having multiple different cyber-security methods and tools. The cyber-security methods and tools in set of cyber-security methods and tools may include any known or available cyber-security method and/or cyber-security tool that is currently available or may become available in future.

Thus, Internet router 220 provides a single point of access to microgrid local area network 222 that only permits a remote client to obtain limited information and/or access to microgrid local area network 222, such as status data and/or load data. The remote client may be a client connecting to microgrid local area network 222 from wide area network 224, such as the Internet.

The microgrid elements of microgrid 200 may be tied to microgrid local area network 222. The microgrid elements of this architecture cannot access the Internet except through microgrid internet router 220, which is a common redundant port controlled by microgrid local area network 222.

Internet access to microgrid local area network 222 may be encrypted and secured.

In this example, a user accessing microgrid local area network 222 from the Internet can only access status data and load measurement information.

Microgrid 200 has a distributed architecture that may utilize cyber security at every tier or level of controllability. Microgrid control center 226 is a control work station within power generation environment 201 that monitors the health and status of controller elements and distributed energy resources associated with microgrid 200. Microgrid control center 226 may be implemented as a microgrid control center, such as microgrid control center 116 in FIG. 1.

Microgrid control center 226 monitors the health and status of microgrid elements by receiving status data 228 from each microgrid element in real-time. Status data 228 indicates the power output by distributed energy resource(s) on microgrid 200, power demands on microgrid 200, and the functional or operational status of microgrid elements.

If status data 228 indicates a failure or decreased output in a first distributed energy resource, the load associated with the first distributed energy resource may be re-assigned to a second distributed energy resource. For example, if a photovoltaic cell(s) produces less energy than expected due to an overcast, cloudy sky, the load for that photovoltaic cell(s) can be shifted to a wind turbine or a diesel generator. In addition, re-configuring microgrid 200 to shift loads to different distributed energy resources and/or re-assigning tasks to different microgrid elements permits installation of a third distributed energy resource into microgrid 200 and/or removal of the first distributed energy resource from microgrid 200 for repair or replacement without disrupting power generation and functioning of microgrid 200. In other words, microgrid 200 can be re-configured to compensate for changes in performance, output or function of individual elements of microgrid 200 with little or no disruption to the overall function, performance, and power output produced by microgrid 200.

FIG. 2 is intended as an example, and not as an architectural limitation for the different advantageous embodiments. For example, in FIG. 2 microgrid control center 226 is depicted as being located remotely to microgrid 200. However, in another advantageous embodiment, microgrid control center 226 may be located locally to microgrid 200.

In addition, as shown in FIG. 2, power generation environment 201 comprises a microgrid and a microgrid control center 226. However, in another advantageous embodiment, power generation environment 201 may also include an electric power utility macrogrid. In this example, microgrid 200 may be connected to and/or slaved to the electric power utility macrogrid.

Figure 3:
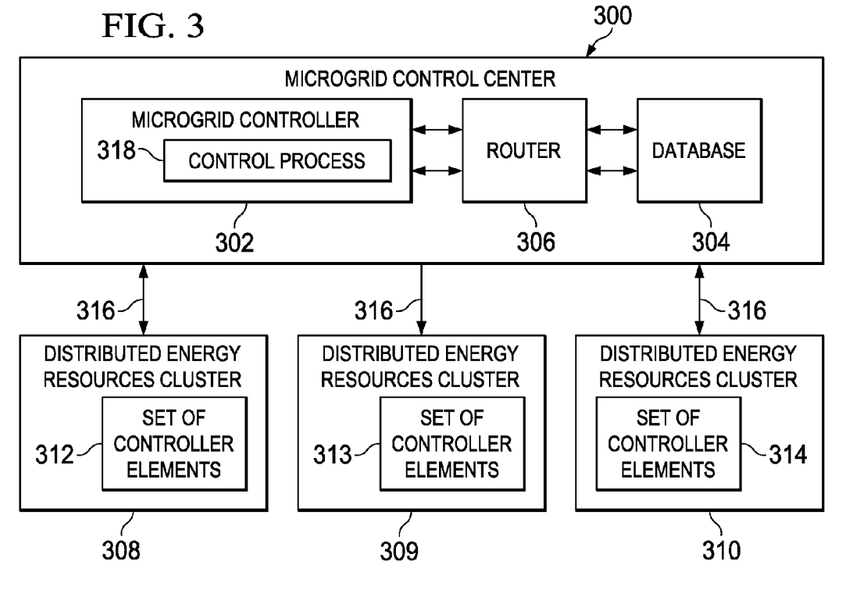
FIG. 3 is an illustration of a microgrid control center in accordance with an advantageous embodiment.

FIG. 3 is an illustration of a microgrid control center in accordance with an advantageous embodiment. Microgrid control center 300 is a workstation that manages a microgrid.

Microgrid control center 300 may include microgrid controller 302, database 304, and router 306.

Microgrid controller 302 is a data processing system that configures distributed energy resources and controller elements in a microgrid, monitors the status and loads associated with the distributed energy resources and controller elements in the microgrid, and re-aligns the controller elements to compensate for element failures.

Database 304 is a redundant database for data storage associated with managing the microgrid. In these examples database 304 may be implemented as a database located on redundant array of independent disks (RAID). Database 304 may be rack mounted.

Router 306 in this example is a network router that establishes a first level network between microgrid control center 300 and the distributed energy resources in the microgrid. Distributed energy resource clusters 308, 309, and 310 are clusters of one or more distributed energy resources associated with the microgrid. In this example, the microgrid includes three distributed energy resource clusters. However, the microgrid may include any number of distributed energy resource clusters, such as a single distributed energy resource cluster, two distributed energy resource clusters, as well as four or more distributed resource clusters.

The set of controller elements 312, 313, and 314 is a set having at least one of a distributed energy resource sensor, a distributed energy resource controller, and a local area network element associated with the microgrid. Further, as used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

Network 316 is a microgrid controller network connecting microgrid control center 300 with the microgrid local area network connecting the distributed energy resources and controller elements. Network 316 in this example is a wide area network connecting a remote microgrid control center 300 with the microgrid. However, in another advantageous embodiment, network 316 may connect a local microgrid controller and local database with the microgrid local area network.

In this example, network 316 may be a microgrid control center network utilizing transmission control protocol/internet protocol (TCP/IP) and user datagram protocol (UDP).

Microgrid control process 318 is a process by which microgrid controller 302 utilizes network 316 to initialize the microgrid system, configure the distributed energy resources and controller elements, determine the average load and local loads associated with the microgrid elements, and monitor the status of microgrid elements.

If microgrid control process 318 identifies a threshold level of change associated with a microgrid controller element or load, control process 318 initiates reconfigurations and/or re-alignments of microgrid elements and resources as necessary to compensate and permit uninterrupted power supply to end users. A threshold level of change associated with a microgrid element may occur due to a controller element failure, an increase in power demand, or a decrease in power production from one or more distributed energy resources.

The microgrid may also include multiple tiers of cyber security. In other words, rather than relying upon a single tier of security, the microgrid shown in FIG. 3 may include multiple tiers of cyber security at every level of controllability, including, but not limited to, cyber security at the microgrid control center 300 level, cyber security at the distributed energy resource cluster 308-310 level, and cyber security at the controller element level.

FIG. 3 is intended as an example, and not as an architectural limitation for the different advantageous embodiments.

Figure 4:
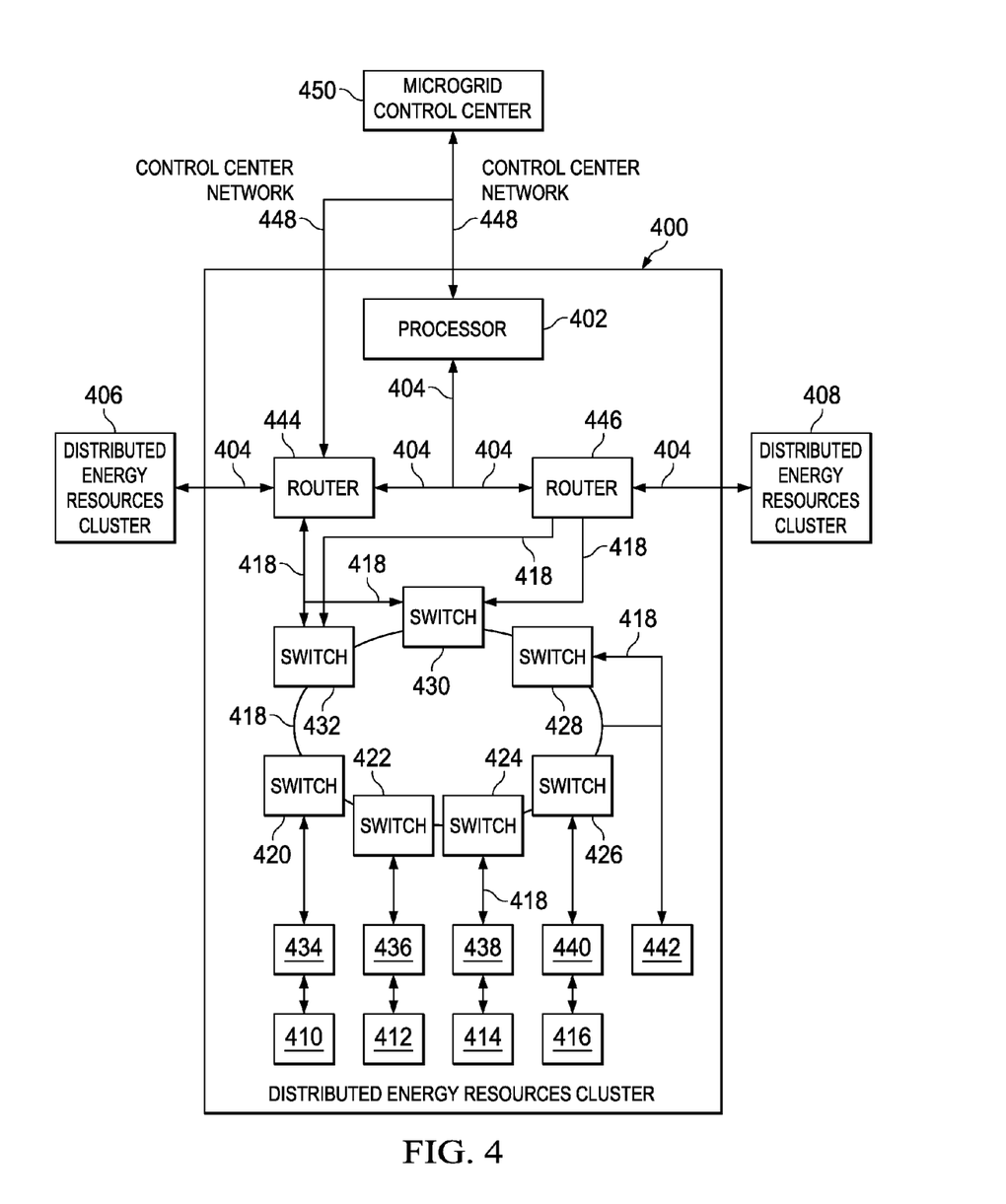
FIG. 4 is an illustration of a distributed energy resource cluster in accordance with an advantageous embodiment.

Turning now to FIG. 4, an illustration of a distributed energy resource cluster is shown in accordance with an advantageous embodiment.

Distributed energy resource cluster 400 is a grouping of one or more distributed energy resources. Each distributed energy resource cluster in the microgrid has at least one processor associated with the distributed energy resource cluster. In this example, distributed energy resource cluster 400 is a grouping of one or more distributed energy resource s associated with processor 402.

Processor 402 may be either a master processor or a slave processor. A master processor may be re-designated as a slave processor as needed. Likewise, a slave processor may be re-designated as a master processor.

The master processor may synchronize microgrid elements and/or provide a robust power bus with no down times. A distributed energy resource processor, whether designated a master or slave, may manage elements in distributed energy resource cluster 400, such as controller elements, network elements, and distributed energy resources.

For example, but without limitation, processor 402 may have the ability to control photovoltaic combiner switch(es), photovoltaic panel(s), direct current bus switch(es), wind turbine charge regulator(s), power inverter(s) and power regulator(s). Processor 402 may have the ability to measure energy harvest, maximize direct current power generation, maximize energy storage, prioritize loads, assign shared loads to slave elements, and synchronize electricity generated with the power interface voltage and/or frequency. Processor 402 may have the ability to control energy harvest and load shedding. Processor 402 may also have the ability to maintain power quality on linear and non-linear loads, adjust local load demand, and configure local setup procedures and system initial configuration.

In this illustrative example, processor network 404 is a peer-to-peer network connecting two or more distributed energy resource cluster processors in the microgrid, such as processor 402, together in a peer-to-peer network. In this example, processor network 404 connects processor 402 of distributed energy resource cluster 400 with the processor associated with distributed energy resource cluster 406 and distributed energy resource cluster 408. Processor network 404 enables processor 402 to exchange status information, load information, and other data with distributed energy resource clusters 406 and 408, as well as any other distributed energy resource clusters on the microgrid having a processor connected to processor network 404.

Controller elements 410, 412, 414, and 416 are distributed energy resource sensors and controllers associated with distributed energy resource cluster 400. Controller elements 410, 412, 414, and 416 may be any type of distributed energy resource sensors and controllers, such as, but without limitation, an inverter, volt/amp monitor, automatic transfer switch, load bank, battery bank control, distributed energy resource control panel, a charge controller, or any other type of controller, sensor, or network element.

Controller elements 410, 412, 414, and 416 are connected together in a peer-to-peer controller network 418. Controller network 418 may be a redundant ring network using the transmission control protocol/internet protocol and user datagram protocol protocols. The ring network may be an Ethernet network. A redundant ring network disables one leg of the ring when a failure occurs. The redundant ring may function as a C-ring.

Controller network 418 comprises switches 420, 422, 424, 426, 428, 430, and 432. Each switch in controller network 418 connects to exactly two other switches to from a continuous pathway for signals through each managed Ethernet switch.

In this example, switches 420, 422, 424, 426, 428, 430, and 432 are, without limitation, managed Ethernet switches. Switches may be dedicated Internet network (DIN) rail mounted components. The processors, such as processor 402, may also optionally be dedicated Internet network rail mounted.

Controller network 418 may utilize a counter-rotating ring to form a redundant ring network topology. A single leg failure between two Ethernet switches causes only a small initial delay in controller network 418 at the time of the Ethernet switch failure.

Each controller element that requires access to network processors on processor network 404 is connected to a managed Ethernet switch in distributed energy resource cluster 400. If a managed Ethernet switch fails, all controller elements connected to that Ethernet switch are isolated from the network.

In this example, every managed Ethernet switch is connected to a single controller element in distributed energy resource cluster 400. In other words, each controller element is connected to its own Ethernet switch in controller network 418. In this example, if a single Ethernet switch fails, only the microgrid element attached to that failed Ethernet switch will be cut off from the network. However, in another advantageous embodiment, a managed Ethernet switch may be connected to two or more controller elements.

In Each controller element connected to an Ethernet switch may use the transmission control protocol/internet protocol and user datagram protocol interface protocol. A controller element may be connected to a protocol converter to convert the protocol of the controller element into the protocol of the Ethernet switches.

As shown in FIG. 4, controller elements 410, 412, 414, and 416 and their associated Ethernet switches 420, 422, 424, and 426 are connected to a universal protocol converter, such as universal protocol converters 434, 436, 438, 440, and 442. Universal protocol converters 434, 436, 438, 440, and 442 convert the protocols used by the controller elements into the protocol used by the managed Ethernet switches. Universal protocol converters 434, 436, 438, 440, and 442 also convert the protocol used by a given Ethernet switch into the protocol used by the controller element connected to that given Ethernet switch.

Routers 444 and 446 may be implemented as one or more router devices that interconnect controller network 418 with processor network 404. Routers 444 and 446 may also be utilized to connect control center network 448 with processor network 404 and controller network 418.

Control center network 448 is a top level network connecting microgrid control center 450 with the microgrid processor network 404. Microgrid control center 450 is a workstation for configuring the microgrid and monitoring the health of the distributed energy resources associated with the microgrid, such as microgrid control center 116 in FIG. 1, microgrid control center 226 in FIG. 2, and 300 in FIG. 3.

Control center network 448, processor network 404, and controller network 418 is the microgrid control, communications, and command network for monitoring, controlling, configuring, and re-configuring microgrid elements. Each of control center network 448, processor network 404, and controller network 418 may have a ring topology using managed Ethernet switches. In this manner, any open network line or failed Ethernet switch will not have a negative impact on operation of the remainder of the microgrid elements.

Any processor can obtain status data from any controller element, distributed energy resource, or other processor connected to the peer-to-peer network.

Thus, the distributed energy resource cluster processors, control center network 448, processor network 404, and controller network 418 reduce the complexity of a microgrid control system by providing the network elements the intelligence and communication capabilities with one or more other microgrid elements.

This allows each microgrid element to know the state of its subsystem or load its controls. This information is communicated to other microgrid elements, which makes the status of neighboring systems within the microgrid known to each distributed energy resource cluster. In this manner, the distributed energy generation and storage capabilities of the microgrid system are increased. Likewise, a single microgrid element failure will not disable or prevent other microgrid elements from operating.

Moreover, control center network 448, controller network 418, and processor network 404 enable the transfer of information between distributed energy resources, microgrid control center 450, processors, and external communication links.

A set of cyber security methods and tools may be implemented at multiple different levels of the microgrid shown in FIG. 4. For example, cyber security methods and tools may be implemented on a level associated with at least one of an individual controller element 410, a set of controller elements, all controller elements associated with a distributed energy resource, an individual distributed energy resource, a given distributed energy resource cluster, processor 402, microgrid control center 450, processor network 404, controller network 418, control center network 448, or any other level of a distributed microgrid architecture. Thus, cyber security may be implemented within multiple different levels using multiple different cyber security methods and/or tools.

FIG. 4 is intended as an example, and not as an architectural limitation for the different advantageous embodiments.

Figure 5:
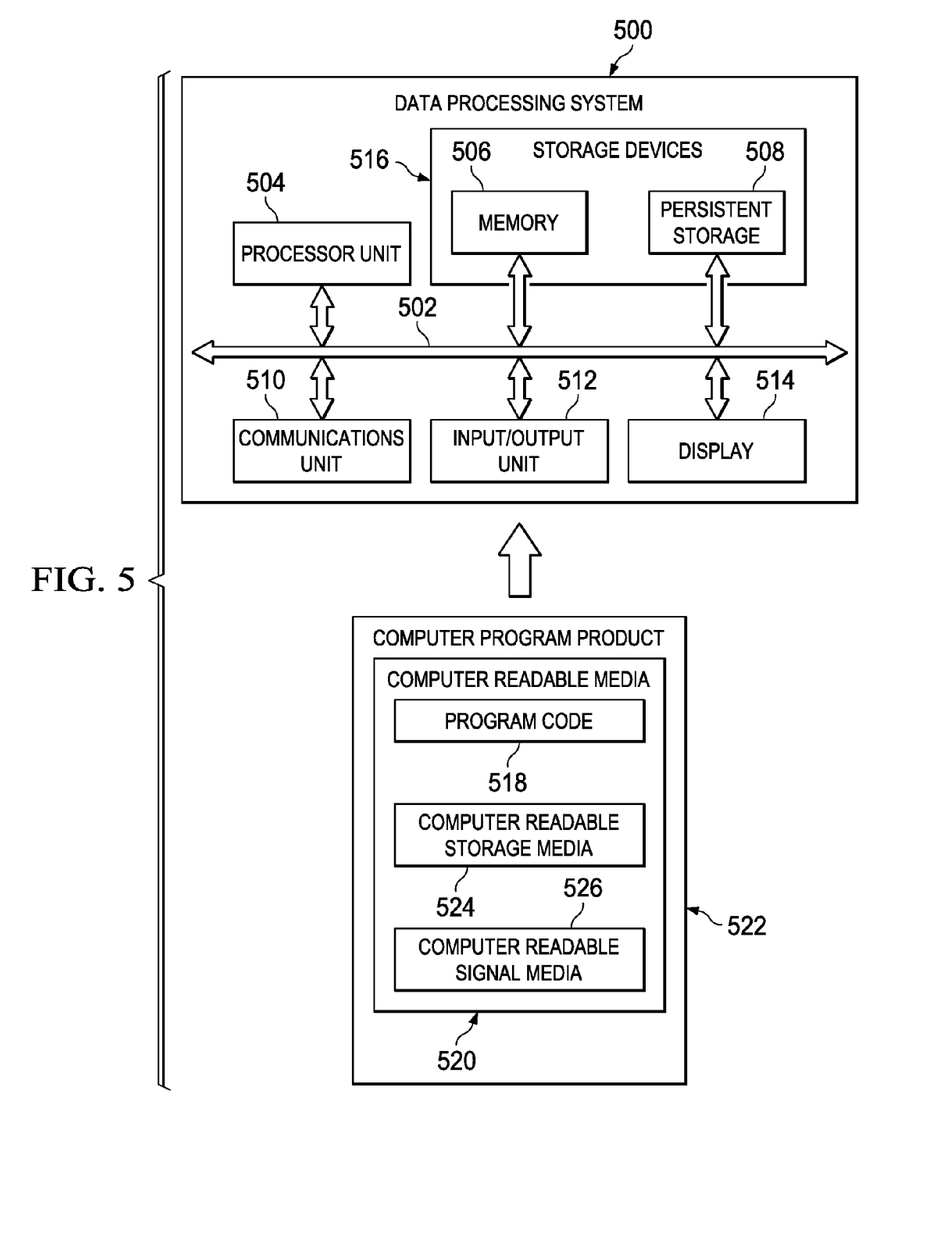
FIG. 5 is an illustration of a data processing system in accordance with an advantageous embodiment.

Turning now to FIG. 5, an illustration of a data processing system is depicted in accordance with an advantageous embodiment. Data processing system 500 may be a data processing system associated with a microgrid control center. Data processing system 500 may be associated with one or more distributed energy resources, controller elements, or control center in a microgrid or power generation environment. For example, and without limitation, microgrid control center 116 in FIG. 1, microgrid control center 226 in FIG. 2, PC server 218 in FIG. 2, microgrid controller 302 in FIG. 3, processor 402 in FIG. 4, and/or microgrid control center 450 in FIG. 4 may be implemented using data processing system 500.

In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a number of processors, a multi-processor core, or some other type of processor, depending on the particular implementation. A number, as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples. In one example, computer readable media 520 may be computer readable storage media 524 or computer readable signal media 526. Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500. In some instances, computer readable storage media 524 may not be removable from data processing system 500. In these illustrative examples, computer readable storage media 524 is a non-transitory computer readable storage medium.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different advantageous embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 518 may be omitted because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in a number of hardware units, while other processes may be implemented in a number of processors.

As another example, a storage device in data processing system 500 is any hardware apparatus that may store data. Memory 506, persistent storage 508, and computer readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506, or a cache, such as found in an interface and memory controller hub that may be present in communications fabric 502.

FIG. 5 is intended as an example, and not as an architectural limitation for the different advantageous embodiments.

Figure 6:
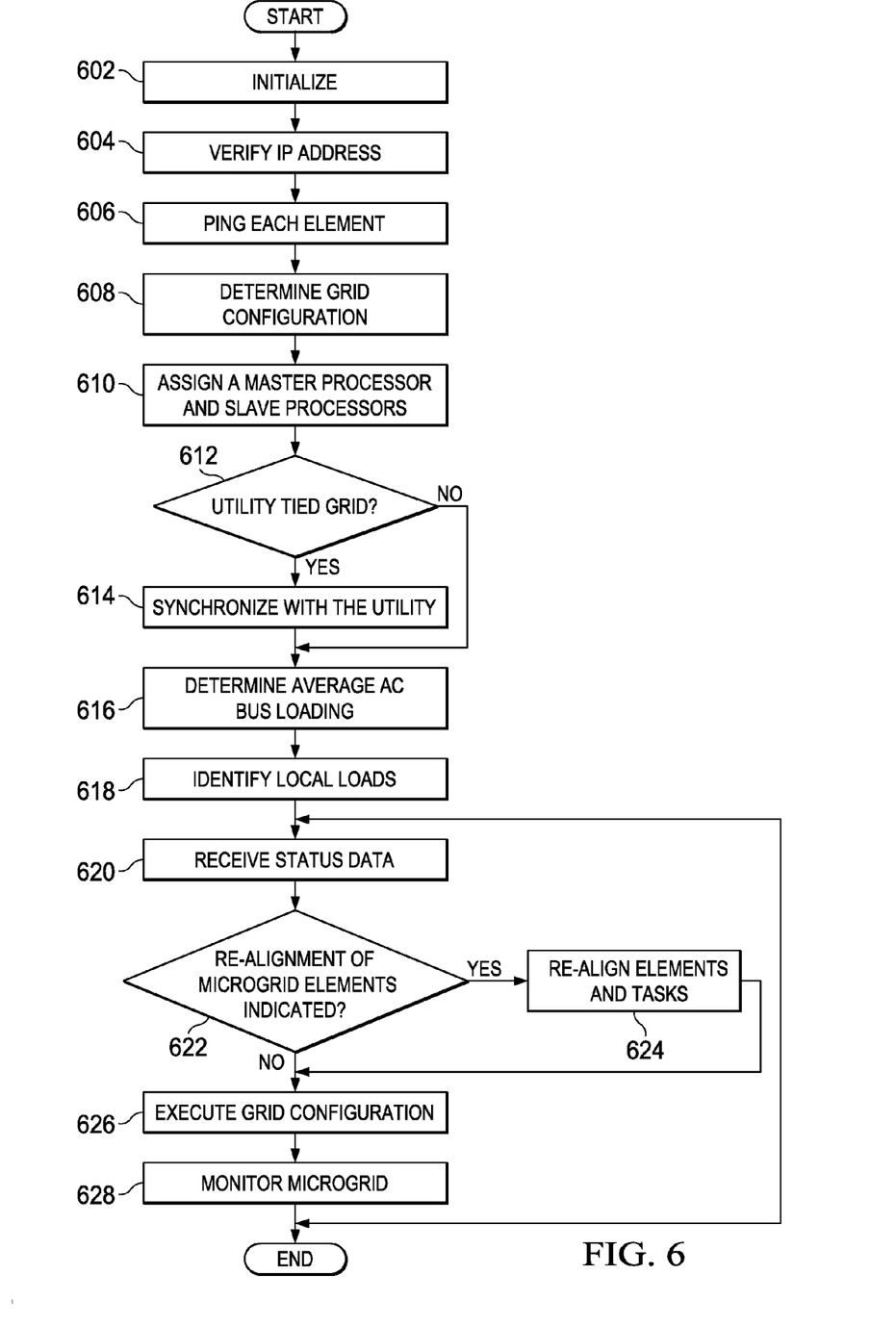
FIG. 6 is an illustration of a flowchart of a process for managing a microgrid in accordance with an advantageous embodiment.

FIG. 6 is an illustration of a flowchart of a process for configuring a microgrid in accordance with an advantageous embodiment. The process illustrated in FIG. 6 may be implemented in a control center for a microgrid, such as microgrid control system 116 in FIG. 1, microgrid control center 226 in FIG. 2, microgrid control center 300 in FIG. 3, and/or microgrid control center 450 in FIG. 4. In particular, this process may be implemented using control process 318 running on microgrid controller 302 in FIG. 3.

The process shown in FIG. 6 begins by initializing a default configuration for each element in a set of microgrid elements (operation 602). The set of microgrid elements may include, without limitation, sensor elements associated with distributed energy resource(s), controller elements associated with distributed energy resource(s), and network elements.

Operation 602 may include setting a default configuration for each element and verifying that the microgrid local area network is secure. In another embodiment, operation 602 may also include the power-up sequence of the entire microgrid system or the power-up sequence for a given distributed energy resource.

The process verifies an Internet protocol address for each element in the set of elements of the microgrid (operation 604). The process may configure or assign Internet protocol addresses to one or more elements at operation 604. In other words, the process verifies network membership of the microgrid elements.

The process pings each element in the set of elements (operation 606). Operation 606 pings each element to verify the configuration of microgrid elements. The process determines a grid configuration (operation 608) based on the results of pinging each element if the microgrid is already operational. If the microgrid is not yet operational with an existing configuration, operation 608 generates a microgrid configuration. In other words, the process at operation 608 creates or selects a configuration for the microgrid.

The process assigns a master processor and slave processor(s) (operation 610). The master processor controls the microgrid systems and/or subsystems. All other distributed resource processors are slaved to the master processor. In this example, but without limitation, operation 612 identifies the processor associated with a distributed energy resource or distributed energy resource cluster that is associated with the primary load to be designated as the master processor. The processors associated with other distributed energy resources or distributed energy resource clusters are designated slave processors to the master processor.

The process makes a determination as to whether the microgrid is a utility tied microgrid (operation 612). If the utility is not a utility tied microgrid, the process executes operation 616. If the microgrid is connected to a utility, the process synchronizes the microgrid with the utility (operation 614). In other words, the microgrid power output is slaved to the utility.

The process determines an average alternating current (AC) bus loading (operation 616). Operation 616 may also determine transmission line impedances.

The process identifies local loads for each distributed energy resource connected to the microgrid (operation 618). The process at operation 618 may also determine the criticality of local loads for each distributed energy resource.

The process receives status data from the set of elements connected in a peer-to-peer network within a microgrid local area network (operation 620). The status data may be received as a result of performing a state of health test for one or more elements in the set of microgrid elements. In one embodiment, a state of health test is performed on every element in the set of microgrid elements.

The process makes a determination as to whether a re-alignment of microgrid elements is indicated based on the status data (operation 622). If the status data indicates a reconfiguration, the process re-aligns the set of elements to form a second grid configuration (operation 624). Re-aligning the set of elements may include changing a set of tasks to be performed by a given element, re-designating a function of a given element, or activating a redundant element to replace a failed element.

The process executes the grid configuration (operation 626). The process continues to monitor the microgrid system (operation 628) in real-time. The process then returns to operation 620 if the monitored status data indicates a grid re-configuration.

The status data may indicate a grid re-configuration if the status indicates a failure in an element in the microgrid, a decrease in power output by a distributed energy resource, an increase in power demand, or any other status change.

Figure 7:
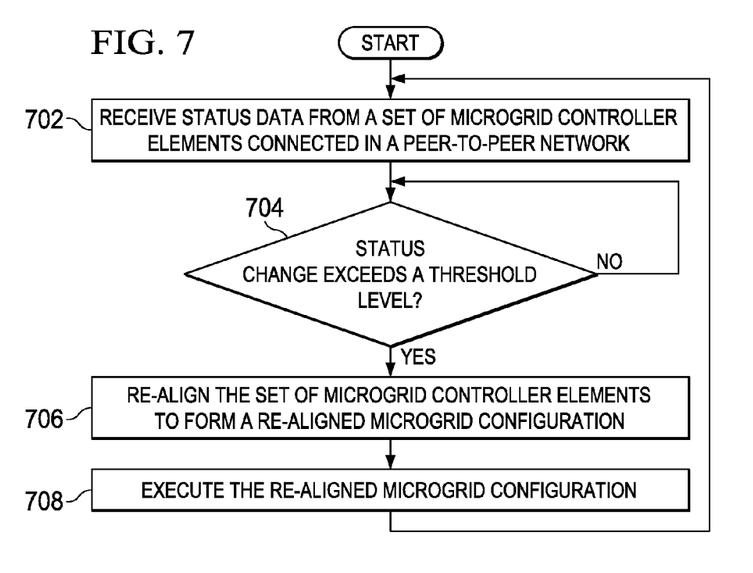
FIG. 7 is an illustration of a flowchart of a process for configuring a microgrid in accordance with an advantageous embodiment.

With reference now to FIG. 7, an illustration of a flowchart of a process for configuring a microgrid is depicted in accordance with an advantageous embodiment. The process illustrated in FIG. 7 may be implemented in a control center for a microgrid, such as microgrid control system 116 in FIG. 1, microgrid control center 226 in FIG. 2, microgrid control center 300 in FIG. 3, and/or microgrid control center 450 in FIG. 4. In particular, this process may be implemented using control process 318 running on microgrid controller 302 in FIG. 3. The process in FIG. 7 may also be implemented by a master processor in a microgrid, such as processor 402 in FIG. 4.

The process begins by receiving status data from a set of microgrid controller elements connected in a peer-to-peer network on a microgrid (operation 702). The process makes a determination as to whether a status change exceeds a threshold level (operation 704).

If the change in status does not exceed a threshold level, the process returns to operation 702 and continues monitoring the status of the microgrid. If the change does exceed the threshold level of change, the process re-aligns the set of microgrid controller elements to form a re-aligned microgrid configuration (operation 706). The process executes the re-aligned microgrid configuration (operation 708). The process returns to operation 702 to continue monitoring the status of the microgrid.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

In one advantageous embodiment, a method is provided for configuring a microgrid. A first configuration of a microgrid having a set of microgrid elements is initialized. An Internet protocol address for each element in the set of elements of the microgrid is verified. An average load and a common load associated with the set of elements is identified. Status data from the set of elements connected in a peer-to-peer network within a microgrid local area network is received. In response to the status data indicating a reconfiguration of the microgrid, the set of elements is re-aligned to form a second grid configuration. The second grid configuration is executed.

Thus, the advantageous embodiments provide an adaptable microgrid control system that provides microgrid elements with portability, re-configurability, and standardization for all microgrid systems and components firmware. The microgrid control system of the advantageous embodiments provides a control system that increases the reliability, utilization, and efficiency of renewable energy sources, distributed energy generation, distributed energy storage, and power quality with predictable, uninterrupted power supply to end users.

The advantageous embodiments also provide a microgrid control system with network health monitoring capabilities and adaptability to compensate for element failures, decreases in energy production from a distributed energy resource, and increases in energy demand from end users.

The different advantageous embodiments also provide a microgrid control architecture and communications network that increases the use of renewable energy sources, distributed energy generation, power storage, and power quality. The microgrid control system of the advantageous embodiments also provides uninterruptible power supply and network health management capabilities. The embodiments also provide a microgrid control system with portability, re-configurability, and standardization for all of the microgrid systems, elements, and components firmware.

The microgrid control system of the embodiments may also be utilized to enable distributed intelligence that reduces the complexity of power system operation by assigning control functions locally at lower levels rather than at a centralized control center. Moreover, the microgrid control system of the embodiments may provide distributed power generation that is redundant, resilient, and has a secure infrastructure.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by, or in connection with, a computer, or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code, such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output, or I/O devices, can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Modems and network adapters are just a few of the non-limiting examples currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for configuring a microgrid comprising a virtual power plant having a plurality of power generation sources and a plurality of power loads, the method comprising:
    pinging each element in a plurality of microgrid elements to verify a configuration of the plurality of micro grid elements;
    initializing, based on a result of the pinging, a first configuration of the microgrid having a plurality of distributed energy resources and the plurality of microgrid elements, the plurality distributed energy resources being autonomous and the plurality of microgrid elements being connected in a peer-to-peer processor network, wherein a plurality of distributed energy resources include at least one small scale power generation element selected from at least one of a wind turbine, a photovoltaic system, a fuel cell, a geothermal power generator, a microturbine, a combustion turbine, a reciprocating engine, a hybrid power generator that uses both heat and power, or a hydroelectric power generator;
    receiving status data from the plurality of microgrid elements that indicates a reconfiguration of the microgrid;
    responsive to receiving status data from the plurality of microgrid elements that indicates the reconfiguration of the microgrid, re-aligning the plurality of microgrid elements to form a second grid configuration; and
    executing the second grid configuration.

2. The method of claim 1, wherein the plurality of microgrid elements comprises at least one of a sensor associated with the plurality of distributed energy resources, a controller associated with the plurality of distributed energy resources, a processor, a router, and a managed Ethernet switch.

3. The method of claim 1 further comprising:
    performing a live test of the first configuration of the microgrid, wherein the live test comprises pinging the each element in the plurality of microgrid elements.

4. The method of claim 1 further comprising:
    identifying an average load and a common load associated with the plurality of microgrid elements.

5. The method of claim 1 further comprising:
    verifying an address for each element in the plurality of microgrid elements.

6. A method for managing a microgrid comprising a virtual power plant having a plurality of power generation sources and a plurality of power loads, the method comprising:
    pinging each element in a plurality of microgrid controller elements to verify a configuration of the plurality of microgrid elements;
    receiving, based on a result of the pinging, status data from the plurality of microgrid controller elements connected in a peer-to-peer controller network connecting the plurality of microgrid controller elements within a microgrid local area network of a microgrid having a plurality of distributed energy resources, the plurality of distributed energy resources being autonomous, wherein the plurality of distributed energy resources is at least one small scale power generation element selected from at least one of a wind turbine, a photovoltaic system, a fuel cell, a geothermal power generator, a microturbine, a combustion turbine, a reciprocating engine, a hybrid power generator that uses both heat and power, or a hydroelectric power generator;
    responsive to the status data indicating a change in the microgrid that exceeds a threshold level, re-aligning the plurality of microgrid controller elements and a plurality of tasks associated with the plurality of microgrid controller elements to form a re-aligned microgrid configuration; and
    executing the re-aligned microgrid configuration.

7. The method of claim 6 further comprising:
    receiving status data from a plurality of distributed energy resource cluster processors connected in a peer-to-peer processor network within the microgrid local area network.

8. The method of claim 6 further comprising:
    responsive to the status data indicating a failure in a first controller element in the plurality of controller elements, assigning a function of the first controller element to a second controller element in the plurality of controller elements.

9. The method of claim 6, wherein a given managed Ethernet switch is connected to a single controller element in the plurality of controller elements.

10. An apparatus comprising:
    a microgrid comprising a virtual power plant having a plurality of power generation sources and a plurality of power loads and having a plurality of distributed energy resources and a plurality of microgrid elements, the plurality of distributed energy resources being autonomous, wherein the plurality of distributed energy resources is at least one small scale power generation element selected from at least one of a wind turbine, a photovoltaic system, a fuel cell, a geothermal power generator, a microturbine, a combustion turbine, a reciprocating engine, a hybrid power generator that uses both heat and power, or a hydroelectric power generator; and
    a microgrid controller associated with the microgrid configured to ping each element in a plurality of micro grid elements to verify a configuration of the plurality of microgrid elements, initialize, based on a result of the pinging, a first configuration of the microgrid; verify an address for each element in the plurality of microgrid elements; re-align the plurality of microgrid elements to form a second grid configuration in response to receiving status data from the plurality of microgrid elements connected in a peer-to-peer network that indicates a reconfiguration of the microgrid; and execute the second grid configuration.

11. The apparatus of claim 10 further comprising:
a plurality of two routers connected to a processor in a distributed energy resource cluster within the microgrid.

12. The apparatus of claim 10, wherein the plurality of elements comprises at least one of a sensor associated with the plurality of distributed energy resources, a controller associated with the plurality of distributed energy resources, a processor, a router, and a managed Ethernet switch.

13. The apparatus of claim 10, wherein the microgrid controller is further configured to perform a live test of the first configuration of the microgrid, wherein the live test comprises pinging the each element in the plurality of microgrid elements.

14. The apparatus of claim 10, wherein the peer-to-peer network is a network within a microgrid control center network and further comprising:
a plurality of microgrid controller elements, wherein the peer-to-peer network further comprises a controller network connecting each element in the plurality of microgrid controller elements to form a peer-to-peer controller network within the microgrid control center network.

15. The apparatus of claim 14 further comprising:
a first controller element in the plurality of controller elements, wherein the first controller element is configured to send controller status data generated by the first controller element to a second controller element in the plurality of microgrid controller elements using the controller network.

16. The apparatus of claim 10, wherein the peer-to-peer network is a network within a microgrid control center network and further comprising:
a plurality of processors, wherein the peer-to-peer network comprises a processor network connecting each distributed energy resource processor in the plurality of processors to form a peer-to-peer processor network within the microgrid control center network.

17. The apparatus of claim 16 further comprising:
a first processor in the plurality of processors configured to send processor status data generated by the first processor to a second processor in the plurality of processors using the processor network.

18. A computer program product for configuring a microgrid comprising a virtual power plant having a plurality of power generation sources and a plurality of power loads, the computer program product comprising:
a computer recordable storage medium that is non-transitory;
program code, stored on the computer recordable storage medium, for pinging each element in a plurality of microgrid elements to verify a configuration of the plurality of microgrid elements;
program code, stored on the computer recordable storage medium, for initializing, based on a result of the pinging, a first configuration of the microgrid having a plurality of distributed energy resources and a plurality of microgrid elements, wherein the plurality of distributed energy resources is autonomous, and wherein the plurality of distributed energy resources is at least one small scale power generation element selected from at least one of a wind turbine, a photovoltaic system, a fuel cell, a geothermal power generator, a microturbine, a combustion turbine, a reciprocating engine, a hybrid power generator that uses both heat and power, or a hydroelectric power generator;
program code, stored on the computer recordable storage medium, for verifying an address for each element in the plurality of microgrid elements;
program code, stored on the computer recordable storage medium, for re-aligning the plurality of microgrid elements to form a second grid configuration in response to receiving status data from the plurality of microgrid elements connected in a peer-to-peer network that indicates a reconfiguration of the microgrid; and
program code, stored on the computer recordable storage medium, for executing the second grid configuration.

19. The computer program product of claim 18, wherein the peer-to-peer network is a network within a microgrid local area network and wherein the peer-to-peer network further comprises a controller network and further comprising:
program code, stored on the computer recordable storage medium, for connecting each controller element in the plurality of microgrid elements in the peer-to-peer controller network within the local area network; and
program code, stored on the computer recordable storage medium, for sending the status data generated by a first controller element on the microgrid to a second controller element in the plurality of microgrid elements using the controller network.

20. The computer program product of claim 18, wherein the peer-to-peer network is a network within a microgrid local area network, wherein the peer-to-peer network further comprises a processor network connecting each distributed energy resource processor in a plurality of cluster processors in the peer-to-peer network within the microgrid local area network, and further comprising:
program code, stored on the computer recordable storage medium, for sending status data generated by a first cluster processor on the microgrid to a second cluster processor in the plurality of cluster processors using the processor network.

* * * * *